Patented Dec. 20, 1932

1,891,608

UNITED STATES PATENT OFFICE

ALFRED W. SCHEIDT, OF SEWAREN, NEW JERSEY, ASSIGNOR TO THE ELECTRIC SMELTING & ALUMINUM COMPANY, OF CLEVELAND, OHIO, A CORPORATION OF OHIO

PROCESS OF PRODUCING ALUMINA

No Drawing. Application filed December 26, 1929, Serial No. 416,766. Renewed June 16, 1932.

This invention relates to the recovery of alumina from aluminous and silicious materials containing alumina.

An object of my invention is to recover the alumina from such aluminous silicious materials by the production of sodium aluminate, in the reaction of which the ratio of the alkali metal aluminate to the dicalcium silicate formed is in the order of a ratio of one to one, or a ratio in which the sodium aluminate may be formed in higher ratios with respect to the dicalcium silicate.

Another object of my invention is to produce sodium aluminate from such aluminous silicious materials by a reaction which can be readily controlled by the addition of a highly aluminous material such as bauxite to secure the desired ratio of sodium aluminate to dicalcium silicate.

In the carrying out of this reaction on such aluminous silicious materials, when the ratio of the sodium aluminate to the dicalcium silicate is in the order of one to one and higher, the reaction is such that it favors a higher yield of sodium aluminate, due to the tendency of the smaller quantity of the insoluble constituents to favor the solution of the sodium aluminate to the extent that a considerably higher extraction of the aluminum content of the material can be effected. Also, with this ratio in the order of one to one and higher, a quicker reaction may be effected, and less dicalcium silicate will be present to be washed and handled, thus making the process more economical and efficient with less waste product and by the handling of a less amount of material than in the prior art.

I have found that very good raw material is ashes, cinders or clinkers produced from the burning of coal, such, for instance, as in power generation, waste piles of coal mines, coal mine strippings and the like, although it is obvious that other aluminous silicious materials can be used, with the addition of a highly aluminous material such as bauxite, either silicious or ferruginous, to obtain the advantages of my process.

In former processes of this type, where calcium carbonate and alkali metal carbonate have been used in connection with aluminous silicious material for the formation of sodium aluminate, special emphasis has been placed on the ratio of lime to silica and the ratio of alumina to alkali metal oxide in the sinters produced, and the importance of the relation between the alkali metal aluminate and the dicalcium silicate produced in such sinters has not been appreciated. In my process I have found that this last relation is highly important, both from a chemical and a commercial viewpoint, to produce sodium aluminate in an economical and efficient manner, and also from materials such as cinders, and by other materials which generally have heretofore been considered as entirely waste products.

In carrying out this invention I make an intimate mixture of finely ground aluminous or silicious material containing alumina, together with the calcium carbonate, which may be used either in the form of finely ground limestone or waste calcium carbonate sludge from caustic soda manufacture; bauxite, of the cheaper grades, such as silicious bauxite or other highly aluminous material; and an alkali metal carbonate, such as soda ash. This mixture is made in such proportions that after sintering preferably one molecule of $SiO_2$ is present for each two molecules of CaO, and one molecule of $Al_2O_3$ is present for each one and one-quarter molecules of $Na_2O$, and, further, there will not be less than one molecule of alkali metal aluminate to each molecule of dicalcium silicate present.

The above mixture of materials can be made by grinding them together in the proper proportions as above or by mixing the previously ground materials together. The grinding may be carried on either with dry materials or with water to form a sludge.

The thoroughly mixed and ground material is then subjected to a sintering temperature in a suitable furnace, such as a rotary furnace, and the sinter produced is ground and leached with water or dilute alkali, which dissolves the alkali metal aluminate, leaving the insoluble dicalcium silicate. The alkali metal aluminate may then be treated to form alumina by well known means. It is obvious, of course, that if waste coal products such as coal mine strippings and the like which have not been burned are used in the furnace charge, the carbonaceous matter in this material will readily be burned out in the furnacing operation.

A comparison of the reactions for treating feldspar, leucite and kaolin according to well known processes, and for treating the same materials according to my invention, is given in the equations below:

The following reactions are well known for feldspar, leucite and kaolin:

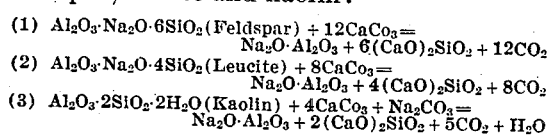

The following reactions are the reactions on the same materials, and also coal ashes, with the application of my invention:

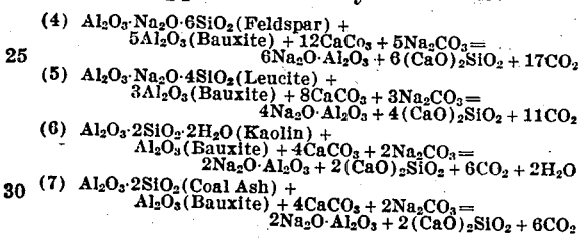

It will be noted in Equations 1, 2 and 3, that are representative of the prior art, the ratio between the sodium aluminate molecules and the dicalcium silicate molecules varies from 1:2 to 1:6. The effect of these ratios is to reduce the amount of soluble sodium aluminate in the sinter produced, and since the sodium aluminate is at present the most valuable product of the reactions, it has proved uneconomical so far to manufacture alumina from these other materials commercially.

It will also be noted in Equations 4, 5, 6, and 7, that show typical reaction formulæ explaining the novel process herein described, the ratio between the sodium aluminate molecules and the dicalcium silicate molecules is 1:1.

I have found that when the proportion of sodium aluminate and dicalcium silicate has the molecular ratio of 1:1, and higher ratios, the furnacing of the sinter is easier because the sintering range is somewhat broader, and it is not necessary to control so accurately the furnacing temperatures.

When the above molecular ratio is considerably less than 1:1 the temperature range between the sintering and fusion is quite small, and this makes it increasingly difficult to properly sinter the charge since very slight variations in flame or furnace temperature will cause overheating in the material, making it plastic, or even liquid, so that it adheres to the furnace lining and causes difficulty. Further, the volatilization of alkali from these charges is more serious on account of the smaller amount of alkali present.

Thus it is to be seen that it is more difficult to secure the desired proper sintered condition and to conserve all of the alkali for use in combination with the aluminum to form alkali aluminate, since the material is usually under or over-burned, with a resulting decrease in yield and efficiency. When the ratio of sodium aluminate to dicalcium silicate is in the order of 1:1, or higher, the charge can be sintered in a rotary furnace readily and easily, with less tendency to fuse, and the effect of slight variations in flame and furnace temperature does not cause over and under-burning of the charge, and there is less tendency of the charge to adhere to the furnace lining.

The recovery of sodium aluminate in leaching is greater by the use of my process, due in part to the tendency of the reaction to complete itself in the direction from left to right on account of the proportion of materials, thus obtaining sodium aluminate from more of the alumina present, and also because in leaching there is a less amount of insoluble residue to handle and wash to obtain the soluble sodium aluminate, both of which contribute to the greater efficiency of the process. The large reduction in the quantity of material that it is necessary to handle to produce a determined quantity of alumina is also highly advantageous.

One of the factors which causes the reactions in Equations 4 to 7 to tend to go to the right is that the reaction between the CaO and $SiO_2$ takes place largely in the solid phase between adjacent particles of solid matter, while the reaction between the $Na_2CO_3$ and $Al_2O_3$ takes place in the liquid phase, the $Na_2CO_3$ melting and dissolving the $Al_2O_3$. The melted $Na_2CO_3$ also assists the formation of the dicalcium silicate because it is quite liquid at the furnace temperature and facilitates the reaction of the $SiO_2$ and CaO by bringing them together, and the fact that there is a much higher content of $Na_2CO_3$ than has been customary so assists the reaction to completion.

The same reasoning holds good for the higher ratios of sodium aluminate to dicalcium silicate in the process, and I have found that by treating aluminous material by my process with ratios of 4 molecules of alkali metal aluminate to 1 molecule of dicalcium silicate, it is possible to secure relatively large recoveries of soluble sodium aluminate.

For example, I have been able to secure 80% by weight of the sintered material or clinker coming from the rotary furnace to dissolve as sodium aluminate, and as much as 91% of the total alumina content of the original furnace charge has been recovered as refined alumina, when the ratio of sodium aluminate to dicalcium silicate has been greater than one to one.

As a general rule a greater recovery of sodium aluminate, and consequently alumina, can be made when the ratio between the sodium aluminate and dicalcium silicate with my process is increased from one to one to two or three, or more, to one. This ratio, however, cannot be indefinitely increased in the commercial operation of a plant on account of the economic factors, because to increase the ratio one necessarily is obliged to use more bauxite and more soda ash, and it therefore becomes a balance of conditions where the cost of the raw materials plus the cost of treatment is balanced against the value of the alumina obtained.

It will thus be seen that in carrying out my process I can add the proper amount of bauxite and alkali metal carbonate, and calcium carbonate to the aluminous silicious material, to recover the maximum amount of sodium aluminate from a given charge with a minimum amount of dicalcium silicate.

The dicalcium silicate may be used as a fertilizer or as a raw material for the manufacture of Portland cement. In the latter case it is only necessary to take the residue of dicalcium silicate, after extracting the sodium aluminate, and mix it with more aluminous material and limestone in the proper proportions to make a suitable charge and sinter the charge in a furnace such as a rotary furnace to give the standard Portland cement clinker.

It will be seen that my process is one which can be readily controlled to produce the desired yield of sodium aluminate and dicalcium silicate, if such becomes more desirable, and therefore the process can be controlled to give the maximum favorable result for any given raw material. For example, any given raw aluminous silicious material, from its cost and chemical characteristics, can be treated according to my process with the proper additions of bauxite and soda ash and lime compound to produce the most efficient result.

It will also be seen that in carrying out my process I can maintain the charge composition uniform by suitably determining the proportions of ingredients to give the most efficient result and maintain that uniform charge proportion. This uniform composition of the charge has the great advantage, economically, of standardizing the time and temperature of the furnacing and other operating conditions which are important in operating at large plant capacity, and also to allow uniform production and obtain uniform quality of products.

Thus when it has been determined that a certain charge composition works best with particular raw materials used, I can maintain this standard composition by my process.

It is possible in the use of highly aluminous raw materials, such as clay, coal ash, etc., to obtain sinters having 40% to 80% of soluble sodium aluminate by means of the suitable proportioning of the charge with the ingredients mentioned, and to obtain an insoluble residue consisting mainly of dicalcium silicate of from 60% to 20%.

It will also be seen that alumina of a satisfactory degree of purity can readily be recovered by well known means from the sodium aluminate solution produced by my process.

While I have mentioned calcium carbonate in the specific examples, it will be understood that other calcium products which are capable of reacting with the aluminous silicious material to form dicalcium silicate, such as calcium oxide or limestone, may be utilized.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The process of treating aluminous silicious material, which comprises forming a charge containing finely divided aluminous silicious material mixed with a material consisting predominantly of alumina, and with calcium carbonate and alkali metal carbonate, sintering the charge and extracting the alkali metal aluminate.

2. The process of treating aluminous silicious material, which comprises forming a charge consisting of ground aluminous silicious material mixed with bauxite, calcium carbonate and soda ash, sintering the charge, and dissolving the sodium aluminate.

3. The process of treating coal ashes and like materials consisting predominantly of aluminous silicate, which comprises forming a charge of such material with calcium carbonate, alkali metal carbonate and with aluminous material consisting predominantly of alumina in molecular proportions to yield a sinter having not less than one molecule of alkali metal aluminate to each molecule of dicalcium silicate, sintering the charge and dissolving the alkali metal aluminate.

4. The process of treating aluminous silicious material, which comprises forming a furnace charge by mixing the material with calcium carbonate, alkali metal carbonate and bauxite in molecular proportions to yield a sinter containing a greater molecular proportion of alkali metal aluminate than dicalcium silicate.

5. The process of treating aluminous material consisting predominantly of aluminous silicate, which comprises forming a furnace charge of such aluminous material with calcium carbonate, alkali metal carbonate and bauxite in molecular proportions to yield a sinter having approximately one molecule of alkali metal aluminate to each molecule of dicalcium silicate, sintering the charge in a suitable furnace, grinding the sinter, and dissolving the alkali metal aluminate.

6. The process of treating aluminous material consisting predominantly of aluminous silicate to obtain substantially uniform production of alkali metal aluminate and dicalcium silicate in the desired proportions of one to the other, which comprises forming furnace charges of such material with material consisting predominantly of alumina, and with calcium carbonate and alkali metal carbonate in molecular proportions to yield sinters containing substantially equal molecular amounts of alkali metal aluminate and dicalcium silicate, sintering the charges and extracting the alkali metal aluminate.

7. The process of treating aluminous silicious material, which consists in forming a charge consisting of the silicious material mixed with bauxite, calcium carbonate and soda ash, sintering the charge and dissolving the sodium aluminate.

8. The process of treating coal ashes and like materials consisting predominantly of aluminous silicate in variable quantities, which comprises forming a charge of such material with calcium carbonate and alkali metal carbonate and with the addition of bauxite in molecular proportions to yield a sinter of uniform composition having not less than one molecule of alkali metal aluminate to each molecule of dicalcium silicate, sintering the charge in a suitable furnace and dissolving the alkali metal aluminate.

9. The process of treating aluminous silicious material, which consists in mixing therewith bauxite, alkali metal carbonate and calcium carbonate in molecular proportions which, with the aluminous silicious material, will yield a sintered product containing not less than one molecule of alkali metal aluminate to each molecule of dicalcium silicate, sintering the mixture, and extracting the alkali metal aluminate.

10. The process of treating coal ashes to form dicalcium silicate suitable for the manufacture of Portland cement, which consists in forming a charge of coal ashes, calcium carbonate, bauxite, and an alkali metal carbonate, sintering the mixture, and forming dicalcium silicate and an alkali metal aluminate and separating the dicalcium silicate from the alkali metal aluminate.

In testimony whereof I affix my signature.

ALFRED W. SCHEIDT.